3,421,871
STEAM REFORMING OF HYDROCARBONS
Phineas Davies, Norton-on-Tees, England, assignor to Imperial Chemical Industries Limited, London, England, a corporation of Great Britain
No Drawing. Filed Dec. 27, 1963, Ser. No. 334,006
Claims priority, application Great Britain, Jan. 3, 1963, 423/63; May 21, 1963, 20,171/63
U.S. Cl. 48—214                                   4 Claims
Int. Cl. C01b 2/14

ABSTRACT OF THE DISCLOSURE

Hydrocarbons are reformed with steam to give synthesis gas or methane-containing fuel gas over a catalyst containing nickel chromite or cobalt chromite or both.

---

This invention relates to steam reforming hydrocarbons with catalysts of high activity and in particular to the use of such catalysts at moderate temperatures to obtain a product gas containing substantial amounts of methane, for example for the production of town gas.

The invention provides a process of steam reforming a hydrocarbon feedstock boiling at temperatures in the range 30° C.–350° C., by passing it with steam over a catalyst containing nickel chromite or cobalt chromite as hereinafter defined or both.

The terms "nickel chromite" and "cobalt chromite" are intended to signify combinations in which the nickel or cobalt oxide or both on the one hand is closely associated with the chromium oxide on the other hand. Such combinations include stoichiometric and non-stochiometric mixtures and compounds of the oxides in which the ratio of nickel or cobalt to chromium is the same as or greater or less than 1:1 by atoms as described below, and include complexed nickel chromite or cobalt chromite as well as uncomplexed nickel chromite or cobalt chromite.

The term "catalyst" is intended to apply to compositions having catalytic activity for the process of the invention and also to compositions which are not strictly active catalysts for example to precursor compositions of such active catalysts, for example to nickel chromite or cobalt chromite compositions which have not been reduced with hydrogen.

In the above reaction the nickel chromite catalyst has been found to show substantial activity at temperatures around 500° C. Accordingly in one form this invention particularly relates to a process in which hydrocarbons boiling at temperatures in the range 30° C.–350° C. are steam reformed at temperatures in the range 400° C.–625° C. especially 450° C.–550° C. over a catalyst containing nickel chromite as hereinbefore defined to produce a gas containing a substantial proportion of methane.

In the above reaction the cobalt chromite catalyst has been found to show substantial activity at temperatures around 600° C. Accordingly in another form this invention particularly relates to a process in which hydrocarbons having a greater molecular weight than methane and boiling at up to 350° C. are steam reformed at temperatures in the range 500° C.–750° C. especially in the range 550°C.–675° C. over a catalyst containing cobalt chromite as hereinbefore defined to produce a gas containing a substantial proportion of methane.

In order to give the catalyst strength the nickel chromite or cobalt chromite or mixture thereof is preferably supported on a refractory support such as, for instance, a refractory oxide or combination of refractory oxides or a hydraulic binding agent; in one preferred form the catalyst support includes a hydraulic binding agent, and this may be in combination with one or more refractory oxides. As a hydraulic binding agent, aluminous cement is preferably used, particularly an aluminous cement such as "Ciment Fondu" or "Secar" (registered trademarks), although portland cement can also be used. If a refractory oxide is used then the oxides of beryllium, magnesium, calcium, strontium, barium, aluminium, cerium, silicon, titanium, zirconium, thorium, vanadium, tungsten, manganese, or chromium are suitable as are also mixtures or compounds of two or more of these oxides. (The support chromium oxide is distinct from that closely associated with nickel or cobalt as chromite.) Particularly useful support materials are magnesia, alumina, silica, chromia, particularly when alumina and/or silica is also present, zirconia, maganese chromate and aluminium silicates, e.g. kaolin.

As examples of especially useful catalysts there may be mentioned nickel chromite on magnesia or alumina, cobalt chromite on magnesia or alumina and nickel chromite on alumina and "Secar" (registered trademark) cement with added alkali as described below.

In order to take advantage of the catalytic activity of the nickel chromite and/or cobalt chromite and at the same time to ensure adequate mechanical strength it is preferred that in the catalyst if it is supported the nickel content calculated as NiO or the cobalt content as CoO or their sum if both are present should be 7% to 25% and more particularly 15% to 25% by weight. (All proportions in this specification are based on the weight of the catalyst after heating at 900° C. to drive off volatiles.)

Catalysts containing a hydraulic binding agent are in two general classes, namely without and with an alkaline compound, and the preferred mode of using the two classes is not the same. The process is best operated at temperature in the lower half of the stated ranges if a catalyst containing a hydraulic binding agent but no alkaline compound is used. For operation in the higher half of the stated temperature ranges if a hydraulic binding agent is present in the catalyst, it is preferred to have magnesia as the main refractory oxide component, or else to have present in it 0.5%–10% w./w. of an alkali metal compound calculated as equivalent $K_2O$. Such a compound however should not be present when the refractory support consists mainly (for example over 90%) of magnesia since alkaline materials appear to impair the strength of such a support material. The alkali metal compound is one which is itself alkaline-reacting in aqueous solution or is converted to an alkaline-reacting substance at high temperatures or under steam reforming conditions. If the catalyst contains silica as a support material it is preferred to use more of the alkali metal compound than if silica is absent; thus if it contains 10% silica it is preferred to use at least 3% thereof calculated as equivalent $K_2O$. To decrease further any tendency to lay down carbon on the catalyst, the feed to the catalyst may contain at least 2 moles of hydrogen per mole of hydrocarbon and preferably between 0.3 and 1 mole of hydrogen per atom of carbon in the hydrocarbon feed used.

The ratio of the concentrations of nickel or cobalt, on the one hand, to the concentration of chromite chromium on the other hand is preferably between 2:1 and 1:2 by atoms for example within about 20% of 1:1. It is believed to be desirable for nickel or cobalt to be substantially in the form of chromites, but it is within the invention to have nickel or cobalt oxides and chromium oxides present partly as uncombined oxides, quite apart from chromia present as a support material.

The catalysts are preferably made by mixing a soluble nickel or cobalt salt (especially the nitrate or acetate) with a chromate or dichromate (especially chromic acid) neutralising to pH 6–8, impregnating a refractory support material with the resulting mixture, for example by slurrying, then filtering, washing, drying and calcining, for example at 400° C. to 500° C. If the support material is itself sufficiently basic, as is, for example magnesia, no base need be added in order to effect neutralisation. Otherwise neutralisation is suitably by means of ammonia.

The catalysts may be used in any of the commonly used shapes, for instance rings or more preferably pellets, e.g. right cylindrical pellets having a maximum thickness between about 2–10 mm. They may be produced for example by moulding, by compression, by pelleting under pressure or by extrusion.

Before bringing the catalyst into use it is preferably subjected to a reduction treatment, preferably with hydrogen containing at most 10% of steam by volume, preferably substantially dry. For cobalt chromite catalysts reduction is preferably at a temperature above 500° C., for example at 600° C. since cobalt compounds are more resistant to reduction than the corresponding nickel compounds. If lower temperatures of reduction for example 450° C.–500° C. are used for a cobalt chromite catalyst the activity is lower but the tendency to form carbon is also decreased. Nickel chromite catalysts are however preferably reduced by such hydrogen at 400° C.–450° C., but higher temperatures e.g. 750° C. may be used. Generally higher reduction temperatures in these ranges are needed for supported catalysts.

The process of this invention is applied to liquid hydrocarbons boiling at temperatures in the range 30° C.–350° C. It is particularly preferred to use hydrocarbons boiling at temperatures in the range 30° C.–220° C. and more preferably to use hydrocarbons boiling at temperatures in the range 30° C.–170° C., since the higher molecular weight hydrocarbons present in the higher boiling feedstocks are more difficult to reform than those of lower molecular weight. The process is particularly applicable to the steam reforming of petroleum light distillates (naphthas). It is preferred that the hydrocarbons contain substantially no or at most 5% of aromatics since these are difficult to reform. The boiling points stated herein refer to atmospheric pressure.

The temperature may be for example in the range 400° C.–950° C. The presure may be for example in the range 0 to 750 p.s.i.g. and is preferably in the range 200–500 p.s.i.g. To produce a synthesis gas for example for the production of ammonia or methanol it is preferred that the methane content of the product gas be as low as is conveniently possible and therefore temperatures in the range 600° C.–900° C. are preferably used together with moderate pressures for example 0 to 750 p.s.i.g. and relatively high steam ratios for example 3–5 moles of steam per atom of carbon present in the hydrocarbon used. If on the other hand it is desired to produce a gas containing substantial amounts of methane in order to produce a town gas or a gas which can be enriched to provide a town gas, the temperature used is preferably in the range 400° C. to 625° C. (nickel chromite catalyst) or 500° C.–750° C. (cobalt chromite catalyst) using a moderately high pressure for example in the range 100 to 600 p.s.i.g. and using a low or moderate steam ratio for example in the range 1.5 to 3, the space velocity over the catalyst being kept sufficiently low to prevent undue breakthrough of the feedstock. Convenient processes useful in town gas production are those of British Application Nos. 20375/32288/62 and 32289/32290/45035/62.

The invention is illustrated by the following examples.

Example 1.—Use of an unsupported nickel chromite catalyst in reforming light distillate A petroleum light distillate boiling over the range 30° C.–170° C. was passed at atmospheric pressure with steam over a catalyst derived from nickel chromite by reduction with hydrogen and steam at 500° C. with the nominal composition before reduction with hydrogen NiO, 46–52%; $Cr_2O_3$, 47–53% (loss at 900° C. was 10%). The results were as shown in Table 1.

TABLE 1

| | | | | |
|---|---|---|---|---|
| Temperature, °C | 600 | 800 | 500 | 600 |
| Steam ratio | 5 | 5 | 2.5 | 2.5 |
| Space velocity (liquid v./v./hr.) | 10 | 10 | 1 | 1 |
| Catalyst volume, ml | 5 | 5 | 25 | 25 |
| Conversion, percent | 36 | 100 | 100 | 100 |
| Gas make rate, l./hr | 52 | 193 | 80 | 96 |
| Gas analysis, percent: | | | | |
| $CO_2$ | 17.9 | 12.7 | 17.2 | 10.2 |
| CO | 7.7 | 14.9 | 7.2 | 15.8 |
| $CH_4$ | 1.1 | 2.3 | 9.8 | 0.8 |
| $H_2$ | 70.4 | 68.2 | 65.2 | 71.6 |
| $C_nH_{2n}$ | 1.5 | 0.1 | 0.1 | 0.1 |
| $O_2$ | 0.1 | 0.7 | 0.1 | 0.1 |

In all runs except column 4 there was little or no tendency to lay down carbon on the catalyst.

Example 2.—Use of an unsupported nickel chromite catalyst in reforming n-heptane A mixture of n-heptane and steam at a constant steam ratio of 3 was passed at atmospheric pressure over a bed of ⅛″ pellets of the catalyst of Example 1, the bed being maintained at 500° C. The results and analysis of the product gas are set out in Table 2. The catalyst volume was 50 ml.

TABLE 2

| | | |
|---|---|---|
| Space velocity (liquid v./v./hr.) | 0.5 | 1.0 |
| Conversion, percent | 98.7 | 100 |
| Gas make rate, litres/hr | 77 | 133 |
| Gas analysis, percent: | | |
| $CO_2$ | 19.5 | 18.2 |
| CO | 3.3 | 3.5 |
| $CH_4$ | 15.3 | 7.6 |
| $H_2$ | 61.0 | 68.2 |
| Unsaturateds | Nil | Nil |

There was little tendency to lay down carbon on the catalyst.

Example 3.—Use of a nickel chromite catalyst containing a hydraulic binding agent with and without alkali A petroleum light distillate boiling over the range 30° C.–170° C. was passed at atmospheric pressure with steam over a catalyst derived from nickel chromite bonded with "Ciment Fondu" (registered trademark) and having (before reduction) the nominal composition after calcination at 900° C. NiO 34–38%, $Cr_2O_3$ 34–38%, remainder "Ciment Fondu" (registered trademark). The reduction of the catalyst before use was by means of steam and hydrogen at 500° C. In a second run there was used a similar catalyst but to which 3% by weight of potassium hydroxide had been added by impregnation before the reduction step. The results are given in Table 3.

TABLE 3

| Catalyst (25 ml.) | Without KOH | With KOH |
|---|---|---|
| Temperature, °C | 500 | 500 |
| Steam ratio | 2.5 | 2.5 |
| Space velocity (liquid v./v./hr.) | 1 | 1 |
| Conversion, percent | 98 | 48 |
| Gas make rate, l./hr | 40 | 39 |
| Gas analysis, percent: | | |
| $CO_2$ | | 22 |
| CO | | 1.6 |
| $CH_4$ | | 0.2 |
| $H_2$ | | 74.0 |
| $C_nH_{2n}$ | | 0.1 |
| $O_2$ | | 0.4 |

The catalyst not containing KOH laid down carbon heavily; when KOH was present this was inhibited.

Example 4.—Use of magnesia supported nickel chromite

A petroleum light distillate of boiling range 30° C.–170° C. was passed at atmospheric pressure with steam over 25 ml. of a catalyst prepared by precipitating nickel chromite with magnesia followed by heating at 400° C. such that the catalyst composition after heating at 900° C. had a composition of 21% NiO, 17.6% $Cr_2O_3$ and the rest MgO (loss at 900° C. was 23.9%). This composition was then reduced by steam+hydrogen at 500° C. before use as a catalyst. The results are shown in Table 4.

TABLE 4

| | |
|---|---|
| Temperature, °C. | 500 |
| Space velocity (liquid v./v./hr.) | 1 |
| Steam ratio | 2.5 |
| Conversion, percent | 60 |
| Gas make rate, l./hr. | 35.7 |
| Gas analysis, percent: | |
| $CO_2$ | 18.6 |
| CO | 5.4 |
| $CH_4$ | 2.9 |
| $H_2$ | 70.6 |
| $C_nH_{2n}$ | 0.1 |
| $O_2$ | 0.4 |

A further sample of the same catalyst composition was calcined at 450° C. instead of 400° C. and was reduced with dry hydrogen and not steamed. The resulting catalyst was highly resistant to mechanical disintegration and was highly active, giving at 600° C. with a steam ratio of 2.5 and a liquid hourly space velocity of 2.5 a conversion of 86%; carbon lay down was very slow at this space velocity and was zero at a space velocity of 1.0.

Example 5

Two catalysts differing in NiO content (A 13.7% and B 10.9%) were made by mixing nickel nitrate, chromium trioxide $CrO_3$ and a slurry of alumina trihydrate, and adding ammonia until the pH was 7. The precipitates were filtered, washed and dried and then calcined at 400° C. for 6 hours. The calcined material was powdered and mixed with ⅛ its weight of "Secar" (registered trademark) cement and pelleted with graphite. After setting the cement the pellets were impregnated with potassium hydroxide solution to give a final $K_3O$ content of 5% and then dried. Before use each catalyst was reduced with hydrogen at 450° C. without steam.

Each catalyst was then used to reform with steam a light petroleum distillate boiling over the range 30° C. to 170° C. The process conditions and results are shown in Table 5.

The rate of carbon lay-down using these catalysts was very small at 500° C. and 600° C. but was inconveniently high at 650° C.

In extended operation it was observed that catalyst A showed a slight tendency to mechanical disintegration, but catalyst B retained its strength.

TABLE 5

| Catalyst | A | | B | |
|---|---|---|---|---|
| Catalyst volume (mls.) | 25 | 25 | 25 | 25 |
| Temperature (° C.) | 500 | 600 | 450 | 500 |
| Space velocity (liquid v./v./hr.) | 1 | 1 | 1 | 1 |
| Steam ratio | 1.5 | 1.5 | 1 | 1 |
| Conversion (percent L.D. converted) | 99 | 100 | 84 | 90 |
| Gas rate (l./hr.) | 61 | 80 | 36 | 43 |
| Gas composition (percent): | | | | |
| $CO_2$ | 16.8 | 9.4 | 20.6 | 17.6 |
| CO | 9.4 | 19.2 | 4.2 | 8.4 |
| $H_2$ | 59.6 | 64.7 | 35.8 | 46.8 |
| $CH_4$ | 13.5 | 4.7 | 38.9 | 27.2 |

Example 6.—Use of magnesia-supported cobalt chromite catalyst

A catalyst consisting of cobalt chromite supported on magnesia was prepared by adding a solution of cobalt nitrate (containing the equivalent of 44 g. cobalt) to a solution of 75 g. chromic oxide ($CrO_3$) in 1 litre of water. 225 g. magnesia was then added slowly. The resulting slurry was heated at 75° C. for 30 minutes and then filtered off and washed. The filter cake was dried, calcined at 400° C. for 4 hours to convert the complex cobalt chromate obtained to the chromite and then pelleted. The catalyst had the composition 22.7% CoO, 14% $Cr_2O$ and 63.3% mgO after calcination at 900° C.

After reduction with hydrogen at 450° C. for 2 hours, the catalyst was tested in the steam reforming of a petroleum light distillate boiling over the range 30° C.–170° C. at atmospheric pressure using a steam ratio of 2.5 moles of steam per atom of carbon at temperatures and space velocities and with results shown in Table 1.

TABLE 6

| Temperature (° C.) | Space velocity, liquid v./v./hr. | Percent hydrocarbon converted |
|---|---|---|
| 450 | 1 | 15 |
| 600 | 2.5 | 62 |
| 650 | 1 | 99 |
| 750 | 1 | 100 |

On testing the same catalyst, reduced with hydrogen at 600° C. under the same conditions at 600° C. the percentage of hydrocarbon converted was 90.

On testing the catalyst (reduced at 450° C.) at a temperature of 600° C. using a steam ratio of 2.0 and a space velocity of 9 liquid v.v./hr., there was substantially no increase in pressure drop over the reformer tube after 6½ hours and very little carbon was deposited.

I claim:

1. A process of steam reforming a normally liquid hydrocarbon feedstock boiling at temperatures in the range 30° C. to 350° C. by passing the feedstock with steam over a refractory supported catalyst comprising a member selected from the group consisting of nickel chromite and cobalt chromite and mixtures thereof in total amounts of about 7% to 25% by weight of the catalysts, calculated as the oxide, at a temperature of about 400° to about 950° C., the atomic ratio of nickel or cobalt to chromite chromium in said catalysts being between about 2:1 and 1:2.

2. A process according to claim 1 wherein the refractory support of the catalyst used includes a hydraulic binding agent.

3. A process according to claim 1 wherein the refractory support contains a member selected from the group consisting of magnesia, alumina, silica, zirconia, manganese chromate and aluminum silicates and chromia.

4. A process according to claim 1 wherein the refractory support of the catalyst contains no more than a minor amount of magnesia and there is present in the catalyst 0.5% to 10% calculated as equivalent $K_2O$ of a compound selected from the group consisting of an alkali metal and alkaline earth metal.

References Cited

UNITED STATES PATENTS

| | | | |
|---|---|---|---|
| 1,943,821 | 1/1934 | Hanks et al. | 23—212 |
| 2,038,566 | 4/1936 | Huettner et al. | 23—212 |
| 2,119,565 | 6/1938 | Williams | 23—212 |
| 2,125,743 | 8/1938 | Sweeney et al. | 23—212 |
| 2,510,189 | 6/1950 | Mahin et al. | 252—455 |
| 2,943,062 | 6/1960 | Mader | 48—196 |
| 3,104,957 | 9/1963 | Porter et al. | 48—197 |

FOREIGN PATENTS 1,307,327  9/1962  France.

JOSEPH SCOVRONEK, *Primary Examiner.*

U.S. Cl. X.R.

23—212; 252—458, 461, 463, 470